Jan. 17, 1967  E. A. SLADE  3,298,399
APPARATUS TO DETECT AND TEMPORARILY SEAL A LEAK IN A PIPELINE
Filed Oct. 27, 1964
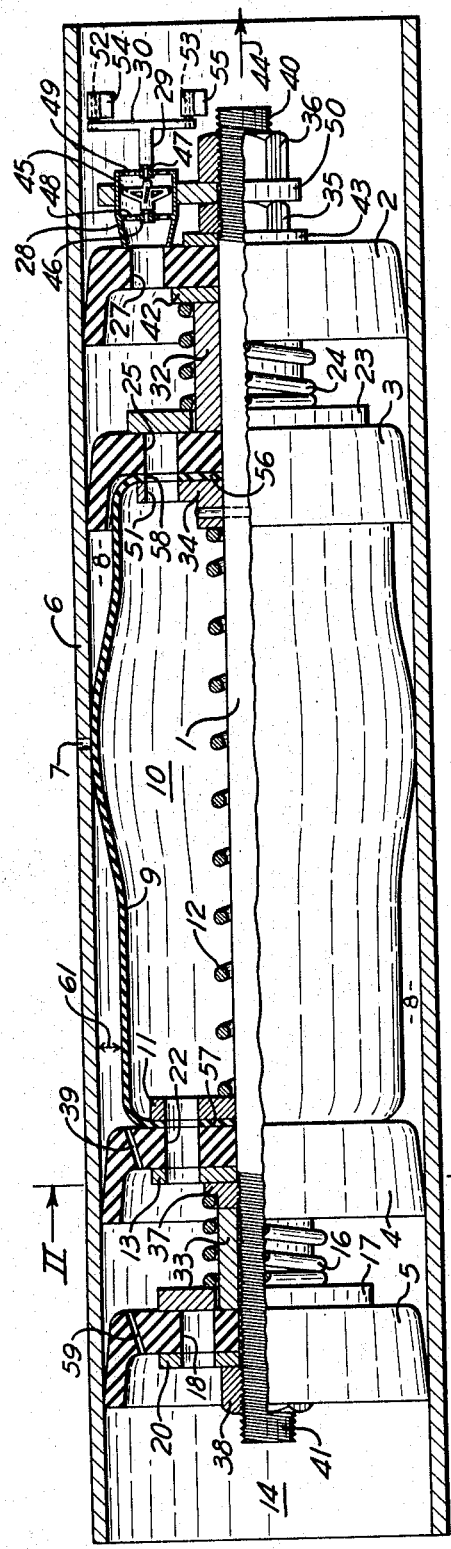
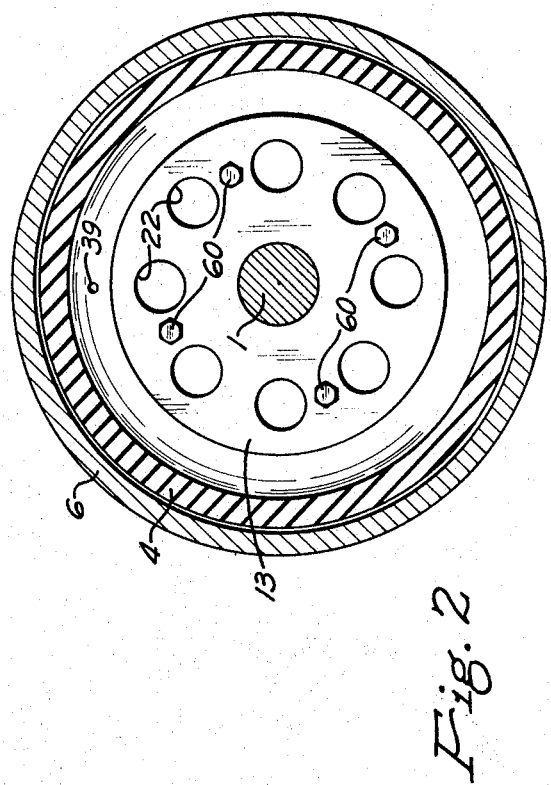
INVENTOR.
ERNEST A. SLADE

United States Patent Office 3,298,399
Patented Jan. 17, 1967

3,298,399
APPARATUS TO DETECT AND TEMPORARILY
SEAL A LEAK IN A PIPELINE
Ernest A. Slade, Lower Allen Township, Cumberland County, Pa., assignor to Warren Petroleum Corporation, Tulsa, Okla., a corporation of Delaware
Filed Oct. 27, 1964, Ser. No. 406,851
6 Claims. (Cl. 138—97)

This invention concerns apparatus for making surveys in pipelines, and in particular concerns a pipeline pig which automatically locates and temporarily seals a leak in a pipeline to which access may be had to the inside only.

It is well known that pipelines occasionally develop leaks which are oftentimes difficult to locate, particularly if the leak is small. In general the prior methods of locating leaks are expensive and have the disadvantage of being incapable of detecting small leaks until the amount of fluid which has leaked out of the pipeline becomes large enough to be recognizable by visual observation. Prior to visual recognition such small leaks may nevertheless cause expensive damages to crops, water supplies, etc., in addition to the loss of accumulated amounts of the transported material. Where pipelines are laid in tile, leaks may persist for long periods of time without detection and the location of surface evidence of the leak may not correspond with the location of the actual pipelines leak. In the case of pipelines for carrying oil, the oil is often corrosive and a pipeline otherwise in good condition may develop a leak due to corrosion pitting. In the case of pipelines which carry refined petroleum products such as gasoline, the fire and explosion hazards which may result from a leak are obvious and illustrate the necessity of promptly locating even small leaks in pipelines of this character. Moreover, it is imperative that a leak of any substantial size be stopped as promptly as possible.

This invention provides apparatus adapted to traverse the inside of a pipeline and which is capable of detecting a leak and automatically applying a temporary seal to stop the leak, and which also gives a recognizable signal at the leak so that its location can readily be identified on the surface of the ground so that the pipeline may be exposed and a permanent repair made.

This invention provides an apparatus called a pig which is carried through the inside of the pipe by the pumped and transported fluid and which is capable of detecting a leak in the pipe wall. The apparatus is placed in the pipe and caused to traverse the inside of the pipe by the transported fluid entirely free of any rigid physical connection to the ends of the pipeline. By means of this invention the entire pipeline may be tested as frequently as desired without introducing wires, lines, or other extraneous means into the pipeline and without interfering with the normal operation of the pipeline. The apparatus traverses the inside of the pipeline and detects and dwells at a leak, temporarily seals the leak, and signals its location so that the pipeline may be repaired at a convenient time, after which the apparatus resumes its traverse of the pipeline seeking and sealing the next leak, and so on until the pipeline traverse is completed.

In the apparatus of this invention wherein it is desired to locate leaks in a pipeline a small segment of pipeline is isolated and any failure of the isolated segment to maintain pressure is detected. The apparatus which isolates a segment of the pipeline moves progressively through the pipe from one end to the other, and during its traverse it detects any failure of the isolated segment to maintain normal pipeline pressure. The apparatus of the invention comprises a pig which may be inserted in a pipeline and which has flexible self-energized packers or flexible cups which seal against the pipeline wall, and which carry an expandable sleeve which upon failure of normal fluid pressure in the isolated segment of the pipeline lying outside the sleeve and between the cups is expanded against the inner wall of the pipeline to seal the leak. Upon sealing the leak, pipeline fluid is permitted to pass through the pig at the same time producing an audible signal.

It is accordingly an object of this invention to provide apparatus for traversing the inside of a pipeline and detecting and sealing a leak in a pipeline whose outer surface is obscured.

It is a further object of this invention to provide apparatus for locating and temporarily sealing a leak in a pipeline and signaling its location.

It is a further object of this invention to provide apparatus for locating a leak in a pipeline by progressively isolating small sections of the pipeline, dwelling at a leak location when found, temporarily sealing the leak, and signaling its location.

It is a further object of this invention to provide apparatus for the detection, location, and temporary internal repair of a leak in a fluid transmittant conduit operating at a positive pressure in excess of atmospheric or that of a surrounding fluid.

It is a further object of this invention to provide apparatus which may be freely pumped from one end of a pipeline to the other end and which detects and temporarily seals a first-encountered leak, and which after the first leak has been repaired externally continues its tranverse to the next leak encountered, and so on until the entire pipeline has been traversed.

Another object of this invention is to provide a new and novel means of quickly stopping the leakage of fluid from a conduit transmitting fluid under pressure.

Another object of this invention is to provide a means for determining the location of a leak in a conduit transmitting fluids under pressure by causing a change in flow and pressure to be recorded at the entrance to or other location along the conduit.

Another object of this invention is to provide a means of allowing the continued flow of fluid in a conduit in which a leak has been located while at the same time preventing the further escape of fluid from the conduit.

Another object of this invention is to provide a means of releasing the leak-stopping device once the leak has been repaired externally.

These and other useful objects are accomplished by the apparatus described in this specification of which the drawing forms a part, and in which FIGURE 1 shows a longitudinal view partly in section of the apparatus of this invention; and FIGURE 2 shows a transverse view of the apparatus as seen at the plane II—II of FIGURE 1.

The apparatus of this invention comprises a body or pig having a plurality of cups or packers that seal against the inside of the pipe whereby in normal operation the device is carried through the pipe by the pipeline fluid behind the pig. The cups are made of oil-resistant elastic material such as synthetic rubber. The first leading cup has an opening connecting with a fluid turbine that drives an eccentric hammer to strike the inside of the pipe whenever the device is arrested and flow through the pig occurs. A second cup is provided with a first spring-loaded valve to permit flow therethrough when the pig is arrested and this cup also carries the forward end of an expandable sleeve whose outside diameter is close to the inside diameter of the pipe. A third intermediate cup is movable on the device and carries the free end of the expandable sleeve so as to permit longitudinal contraction of the sleeve as the latter expands radially. A fourth rearmost cup has a second spring-loaded valve which permits passage of pipeline fluid in the event that movement of the device is arrested as when a leak is detected.

A preferred embodiment of the invention is illustrated in FIGURE 1 which is a longitudinal view, partly in cross section of the apparatus inside the pipeline 6. The pipeline 6 carries fluid in the direction indicated by the arrow 44 and in the absence of a leak the apparatus is caused to traverse the pipeline in this direction by movement of the flowing fluid in the manner of a conventional pipeline pig. A leak in the pipe is diagrammatically indicated at 7.

The respective elements of the device are assembled on a central longitudinal rod 1, that is threaded at both ends 40 and 41. A stop collar 34 is rigidly fastened to the rod 1 as by welding and by being pinned thereto. One end 56 of an elastic boot 9 and a cup 3 similar to a conventional scraper cup are assembled against the stop collar 34 by metal spacer sleeve 32, which slips over the rod 1. The leading cup 2 is held between washers 42 and 43 by means of clamping nut 35 threaded onto the forward end 40 of rod 1. It is apparent that by tightening nut 35 the forward cups 2 and 3 and the forward end of the expandable sleeve 9 are held tightly in place. After tightening, nut 35 may be locked by means of a conventional cotter pin not shown.

Cup 2 is provided with an opening 27 against which there is mounted a fluid turbine 28 of conventional design having impeller blades 45. The turbine bearings 46 and 47 are held in spiders 48 and 49 fastened to the turbine housing 28 which in turn is fastened in an arm 50 that is rigidly clamped to the rod 1 by means of nut 36. The turbine housing 28 has its intake opening substantially in contact with the opening 27 in cup 2 so that pipeline fluid passing through the opening 27 will energize the impeller 45 of the turbine 28. The turbine shaft 29 is provided with a conventional pipeline rattler 30 having pins 52 and 53 at diametrically opposed points. Each of the pins 52 and 53 carries a loose rotatable eccentric hammer 54 and 55 which strikes the inside of the pipe 6 whenever the turbine 28 is driven by fluid passing through opening 27. The hammers 54 and 55 are sufficiently heavy so that when turbine 28 causes the rattler 30 to revolve, the rattling blows can be heard outside the pipe 6 even though the latter be buried under several feet of earth. As will become evident later, the turbine 28 does not rotate when the device traverses the pipeline in normal operation, i.e. in the absence of a leak.

The cup 3 and the forward end 56 of boot 9 are provided with aligned openings 25 and 58 which are maintained in register with openings 51 in the stop 34, the elements 3 and 56 being tightly clamped between stop collar 34 and clamping sleeve 32. The opening 25 in cup 3 is closed by means of a valve plate 23 loosely mounted on the outside of sleeve 32 and pressed against the cup 3 by means of valve spring 24 whose fixed end abuts the washer 42. Only one opening 25 is seen in FIGURE 1, but there may be a plurality of such openings in elements 34, 56, and 3, all of such openings 25 being normally closed by the valve 23. The spring 24 is sufficiently stout so that it will hold the valve 23 seated at a pressure sufficient to cause the entire device to move forward in the pipeline, whereby in normal operation the valve 23 remains closed and the device is caused to traverse the pipeline by the pipeline fluid. However, in the event that the device encounters and hangs up at a leak in the manner to be described, the valve 23 will be lifted off its seat against the force of spring 24 and will allow pipeline fluid to pass through the openings 25. The pipeline fluid which thus passes through openings 25 also passes through opening 27 in cup 2 and actuates the rattler 30 to indicate an abnormal condition.

The boot 9 is made of an oil resistant elastic material, as for example synthetic rubber, which may be reinforced with fabric to impart additional strength. The boot has an outer diameter that is but slightly less than the inside diameter of the pipe 6, the clearance between the outside of the boot and the inside of the pipe being indicated by 61. This clearance may, for example, be of the order of ⅛ inch. The boot 9 is molded with partly closed ends 56 and 57, the forward end 56 being clamped to the cup 3 as previously explained. The rearward end 57 of the boot is clamped together with cup 4 between two clamping plates 11 and 13 by means of a number of bolts 60 through these elements as indicated in FIGURE 2, the latter being a transverse view looking at the rear surface of clamping plate 13. The assembly comprising clamping plate 13, cup 4, boot end 57, and clamping plate 11 may slide freely on central rod 1. Clamping plate 13, cup 4, the end 57 of boot 9, and clamping plate 11 are all provided with a plurality of openings 22, the openings in the respective elements 13, 4, 57, and 11 being held in register by the clamping bolts 60. The assembly comprising elements 4, 11, 13, and the rearward end of boot 9 is pushed to the rear by a compression spring 12 whose forward end abuts the stop 34. Maximum longitudinal extension of the spring 12 and of boot 9 is determined by the longitudinal position of a nut 37 threaded on the rearward end 41 of the rod 1. The position of nut 37 is such that the spring 12 will push the sliding assembly 13, 4, 57, and 11 against nut 37 and upon doing so the boot 9 will be substantially in an unstressed condition with its outer cylindrical surface having slight clearance, indicated by 61, from the inner wall of the pipe 6. The nut 37 is prevented from turning on rod 1 by a conventional pin (not shown) which passes through the nut and the rod. The compression of spring 12 in its most expanded condition is only enough to hold the boot free of the pipe wall. The cup 4 has a small bleed hole 39 which allows limited access of fluid to the annular space 8 between the boot 9 and pipe 6 and intermediate the cups 3 and 4. The purpose of perforation 39 will become evident later.

A sleeve 33 which slips onto rod 1 is placed against the nut 37. Against the sleeve 33 is placed the rearmost cup 5 and a clamping plate 20 and the assembly is clamped up tightly by means of nut 38. The nut 38 may be locked by means of a conventional cotter pin (not shown). The cup 5 and the clamping plate 20 are provided with one or more registering openings 18 which are closed (except for a small bleed hole 59 whose purpose will become evident later) by a valve plate 17 that is loosely mounted on the outside of sleeve 33 and is held seated against cup 5 by means of compression spring 16. The spring 16 exerts sufficient force against the valve 17 to maintain the latter seated in normal operation during traverse of the pipeline, but when the pig finds and hangs up at a leak, the pipeline flow will lift the valve 17 off its seat against spring 16 and allow pipeline fluid to pass through the openings 18.

Operation of the apparatus may now be described. The pig is launched in the pipeline in conventional manner and in the absence of a leak will traverse the pipeline. During such normal traverse the valves 17 and 23 remain seated since any small differential pressure across the pig resulting from the friction of cups 2, 3, 4, and 5 on the pipe wall is insufficient to unseat these valves against their respective springs 16 and 24. The boot 9 is in a cylindrical relatively flaccid condition and the pipeline pressure is the same in space 8 outside the boot as in the space 10 inside the boot. Note that the annular space 8 outside the boot and lying between the cups 3 and 4 is of relatively small volume and is inaccessible except through the small bleed holes 59 and 39. The small volume 8 is a segment of the pipeline whose ability to hold pressure is effectively tested by the pig, and this test segment progresses along the pipe as the pig traverses the pipeline. When a leak is encountered in the test space 8, the boot 9 will quickly be expanded radially by the difference in pressure between the inside space 10 and outside space 8 around the boot, such radial expansion of the boot being accompanied by longitudinal contraction of the boot. As the boot expands, the assembly of elements 13, 4, 57, and 11 moves forward on rod 1 against the compression of spring 12. Note that the leak also gives rise to a force tending to move cup 4 forward on rod 1 because of the reduced pressure where the annular region 8 outside the boot acts on the outer forward rim of cup 4, and this force further assists in compressing spring 12. Due to the small volume of space 8, the boot 9 will quickly be expanded into tight contact with the inner wall of pipe 6 at the leak and will effectively seal off the leak 7. At the same time the pipeline pressure in the space 14 behind the pig will build up until valve 17 and valve 23 are lifted off their seats thus allowing pipeline fluid to pass through openings 18, 22, 25, and 27 and drive the turbine 28 which actuates rattler 30.

The fact that the pig has found and hung up at a leak will be apparent to the pipeline operator in several ways. It will, of course, not arrive at its destination at the scheduled time. The operator can determine its location by examination of the pipeline input pressure chart. Inasmuch as a slight additional pressure is required to unseat valves 17 and 23 in the hung-up pig, the pressure chart at the input pump station will show a sharp pressure increase at the time the pig stops. Knowing the launching time when the pig started its traverse, and the pumping rate, the operator can by well-known methods compute the location of the hung-up pig at the time when the recorded pressure increase occurred. The operator can then dispatch a repair crew to the computed location, and the exact location will immediately become evident from the audible sound made by the rattler 30. The crew will then uncover the pipeline and apply a conventional clamp to the outside of the pipe to permanently seal the leak or take whatever other steps are necessary to make a good repair.

As soon as the leak is stopped by a seal outside of the pipe, normal pipeline pressure will again build up in space 8 by pipeline fluid bleeding through openings 59 and 39. Spring 12 will then longitudinally expand the boot 9 which will pull radially away from the pipeline wall thus again freeing the pig. The valves 17 and 23 will close and the pipeline fluid will cause the pig to continue its traverse until it finds another leak or until it reaches the scraper trap at the end of its traverse.

It is evident that the function of finding and temporarily sealing a leak is performed by the boot 9 spaced from, but with its ends sealed to, the inside of the pipe by cups 3 and 4, the pig being pushed through the pipe by a differential pressure insufficient to unseat valve 23. Accordingly, the rattler 30 and its driving turbine 28 as well as cup 2 may be omitted without interfering with the leak detecting and stopping function. Furthermore, inasmuch as valves 17 and 23 are in series it is evident that if the inside of the pipeline is relatively smooth so that there is very little friction between the pig and the pipe, the cup 4 and its valve 17 may be omitted since these elements are primarily for the purpose of insuring that the pig will not accidentally hang up at a rough spot in the pipe which is not a leak.

It is apparent that this invention thus provides a pig capable of detecting a leak whose size is such as to have a flow resistance of the same order of magnitude as that of bleed holes 39 and 59 which may be made quite small. The pig furthermore immediately seals such a leak and dwells at the location, meanwhile allowing pipeline fluid to pass through the location with only enough restriction to give a recognizable pressure kick on the pipeline pressure chart, and also producing an easily recognizable audible sound outside the pipe. Subsequently, when the leak is externally repaired, the pig of this invention resumes its traverse having been unchanged by its residence at the first encountered leak. The pig will detect and seal successive leaks in this manner until it has completed its traverse of the pipeline.

What I claim as my invention is:

1. A pipeline pig adapted to detect and temporarily seal a leak in a pipeline comprising
    an axial carrier,
    an expandable sleeve having one end rigidly mounted on said carrier and in sealing engagement with the inside surface of said pipe, and having its other end slidably mounted on said carrier and in sealing engagement with the inside surface of the pipe, thereby to define a substantially closed annular space between said sleeve and the inside wall of the pipe,
    valve means on said carrier restricting flow of pipeline fluid through the inside of said sleeve, and
    said valve means being adapted to open to allow fluid therethrough whenever said sleeve is forced against the inside surface of the pipe because of a leak in the pipe communicating with said substantially closed annular space.

2. A pipeline pig adapted to detect and temporarily seal a leak in a pipeline comprising
    an axial carrier,
    an expandable sleeve smaller in diameter than the pipe and having one end rigidly sealed on said carrier and forming a sliding seal against the inside surface of the pipe, and having its other end slidably mounted on said carrier and forming a sliding seal against the inside surface of the pipe, thereby to define a substantially closed annular space between said sleeve and the inside wall of the pipe,
    a spring-biased valve on said carrier restricting flow of pipeline fluid through the inside of said sleeve,
    said valve being adapted to open to allow fluid therethrough whenever said sleeve is forced against the inside surface of the pipe because of a leak in the pipe communicating with said substantially closed annular space, and
    a flow-actuated rattler adapted to be energized by fluid flow through the inside of said sleeve to produce an audible sound outside the pipe.

3. A pipeline pig adapted to detect and temporarily seal a leak in a pipeline comprising
    an axial carrier,
    an expandable sleeve smaller in diameter than the pipe and having one end rigidly sealed on said carrier and forming a sliding seal against the inside surface of the pipe, and having its other end slidably mounted on said carrier and forming a sliding seal against the inside surface of the pipe, thereby to define a substantially closed annular space between said sleeve and the inside wall of the pipe,
    a spring-biased valve carried on said carrier permitting flow of pipeline fluid through the inside of said sleeve only when the pipeline pressure behind said rearward sliding seal exceeds the pipeline pressure ahead of said forward sliding seal by a predetermined amount, and
    a restricted opening from the space inside said sleeve to said substantially closed annular space to allow said sleeve to contract radially when the leak in the pipeline has been externally stopped.

4. A pipeline pig adapted to detect and temporarily seal a leak in a pipeline comprising
    an axial carrier,
    an expandable sleeve smaller in diameter than the pipe and having one end rigidly sealed on said carrier and forming a sliding seal against the inside surface of the pipe, and having its other end slidably mounted on said carrier and forming a sliding seal against the inside surface of the pipe, thereby to define a substantially closed annular space between said sleeve and the inside wall of the pipe, a spring-biased valve carried on said carrier restricting flow of pipeline fluid through the inside of said sleeve, said valve means being adapted to open under a predetermined excess pressure in the pipeline space behind said rearward sliding seal over that in the pipeline space ahead of said forward sliding seal occurring whenever said sleeve is forced against the inside surface of the pipe because of a leak in the pipe communicating with said substantially closed annular space, and a restricted opening from the space inside said sleeve to said substantially closed annular space to allow said sleeve to contract radially when the leak in the pipeline has been externally stopped.

5. A pipeline pig adapted to detect and temporarily seal a leak in a pipeline comprising an axial mounting means, a first cup rigidly mounted on and sealed to said mounting means and forming a sliding seal against the inside surface of the pipe, an opening in said first cup, a first spring-biased valve closing said opening in said first cup and permitting fluid exceeding a predetermined minimum pressure to discharge from space behind said first cup to space ahead of said first cup, a second cup slidably mounted on said mounting means behind said first cup and forming a sliding seal against the inside surface of the pipe, a radially expandable boot smaller in unexpanded diameter than the inside diameter of the pipe and connected to said first cup and to said second cup, a compression spring between said first cup and said second cup tending to longitudinally extend said boot, a large opening in said seond cup permitting access of fluid from behind said second cup to space inside said boot, and a restricted opening in said second cup permitting access of fluid from behind said second cup to space outside said boot.

6. A pipeline pig adapted to detect and temporarily seal a leak in a pipeline comprising an axial rod, a first cup rigidly mounted on and sealed to said rod and forming a sliding seal against the inside surface of the pipe, an opening in said first cup, a fluid turbine in communication with said opening in said first cup, a rattler mounted on said rod and actuated by said turbine and adapted to strike the pipe when actuated, a second cup rigidly mounted on and sealed to said rod behind said first cup and forming a sliding seal against the inside surface of the pipe, an opening in said second cup, a first spring-biased valve closing said opening in said second cup and permitting fluid exceeding a predetermined minimum pressure to discharge from space behind said second cup to space ahead of said second cup, a third cup slidably mounted on said rod behind said second cup and forming a sliding seal against the inside surface of the pipe, a radially expandable boot smaller in unexpanded diameter than the inside diameter of the pipe and connected to said second cup and to said third cup, a compression spring between said second cup and said third cup tending to longitudinally extend said boot, a large opening in said third cup permitting access of fluid behind said third cup to space inside said boot, a restricted opening in said third cup permitting access of fluid from behind said third cup to space outside said boot, a fourth cup rigidly mounted on and sealed to said rod behind said third cup and forming a sliding seal against the inside surface of the pipe, an opening in said fourth cup, a second spring-biased valve closing said opening in said fourth cup and permitting fluid exceeding a predetermined minimum pressure to discharge from space behind said fourth cup to space ahead of said fourth cup, and a restricted opening bypassing said second valve.

References Cited by the Examiner

UNITED STATES PATENTS 2,743,743   5/1956   Galloup _____ 138—97

LAVERNE D. GEIGER, *Primary Examiner.*

T. L. MOORHEAD, *Assistant Examiner.*